(12) United States Patent
Johnson et al.

(10) Patent No.: US 6,389,909 B1
(45) Date of Patent: May 21, 2002

(54) FLOWMETER MOUNTED WITH U-SHAPED BRACKET AND CLAMPING DEVICE

(76) Inventors: Dwight N. Johnson, 6361 Yarrow Dr., Carlsbad, CA (US) 92009; Daivd A. Saar, 37 Todd Ridge Rd., Titusville, NJ (US) 08560; Wade W. Smith, 3311 Round Hill Rd., Branchburg, NJ (US) 08876; Christian Siebert, 2-Elbeweg, D-34131 Kessel (DE)

( * ) Notice: Subject to any disclaimer, the term of this patent is extended or adjusted under 35 U.S.C. 154(b) by 0 days.

(21) Appl. No.: 09/524,502

(22) Filed: Mar. 13, 2000

(51) Int. Cl.[7] ............................................... G01F 15/06
(52) U.S. Cl. .................................. 73/861.78; 73/861.77
(58) Field of Search .......................... 73/861.78, 861.71, 73/861.73, 861.74, 861.75, 861.77, 861.79; 340/870.02; 374/208, 147; 137/551; 248/551, 500, 505

(56) References Cited

U.S. PATENT DOCUMENTS

| 4,454,767 A | * | 6/1984 | Shinkai et al. | ............ | 73/861.18 |
| 5,003,828 A | * | 4/1991 | van den Burg | .......... | 73/861.33 |
| 5,337,615 A | * | 8/1994 | Goss | ....................... | 73/861.33 |
| 5,659,300 A | * | 8/1997 | Dresselhuys et al. | .. | 340/870.02 |

* cited by examiner

Primary Examiner—Benjamin R. Fuller
Assistant Examiner—Corey D. Mack
(74) Attorney, Agent, or Firm—Spencer T. Smith

(57) ABSTRACT

A system for monitoring the flow of water through a pipe. A metering device is located in a pipeline. A transmitting unit including a sensor is contained within a housing which has a frame projecting horizontally outwardly from the housing. A clip having an elongated band and a "U" shaped clasp at either end has an inner clasp portion and an outer catch portion to hold the meter against the housing.

5 Claims, 4 Drawing Sheets

FLOWMETER MOUNTED WITH U-SHAPED BRACKET AND CLAMPING DEVICE

BACKGROUND OF THE INVENTION

The present invention relates to a flowmeter for monitoring the flow of water through a pipe and more particularly to a battery operated flowmeter which can transmit flow related data (volume and/or temperature) to a remote receiver.

It is becoming more and more important to conserve our resources. It has long been appreciated that monitoring and billing for resource use, such as water use, will cause a decrease in the use of the monitored resource.

To monitor very local water use, such as water use by a tenant in an apartment complex, flow through a number of pipes will have to be monitored. The equipment for achieving this objective will have a low cost, be very inexpensive to install or replace, and be tamper resistant, if it is to be economically viable.

OBJECT OF THE INVENTION

It is accordingly an object of the present invention to provide a battery powered flowmeter which can be produced at low cost and which can be easily installed but which will be tamper resistant when installed.

In the present invention, a water supply line is disconnected to insert a flow indicating device which can produce a repetitive signal representative of the flow through the pipe. A transmitting device, which can receive the repetitive signal and transmit data based thereon to a host device, is secured on the flow indicating device with a locking clip that must be destroyed to separate the transmitting device from the flow indicating device.

Other objects and advantages of the present invention will become apparent from the following portion of this specification and from the accompanying drawings which illustrate in accordance with the mandate of the patent statutes a presently preferred embodiment incorporating the principles of the invention.

BRIEF DESCRIPTION OF THE PREFERRED EMBODIMENT

Figure 2:
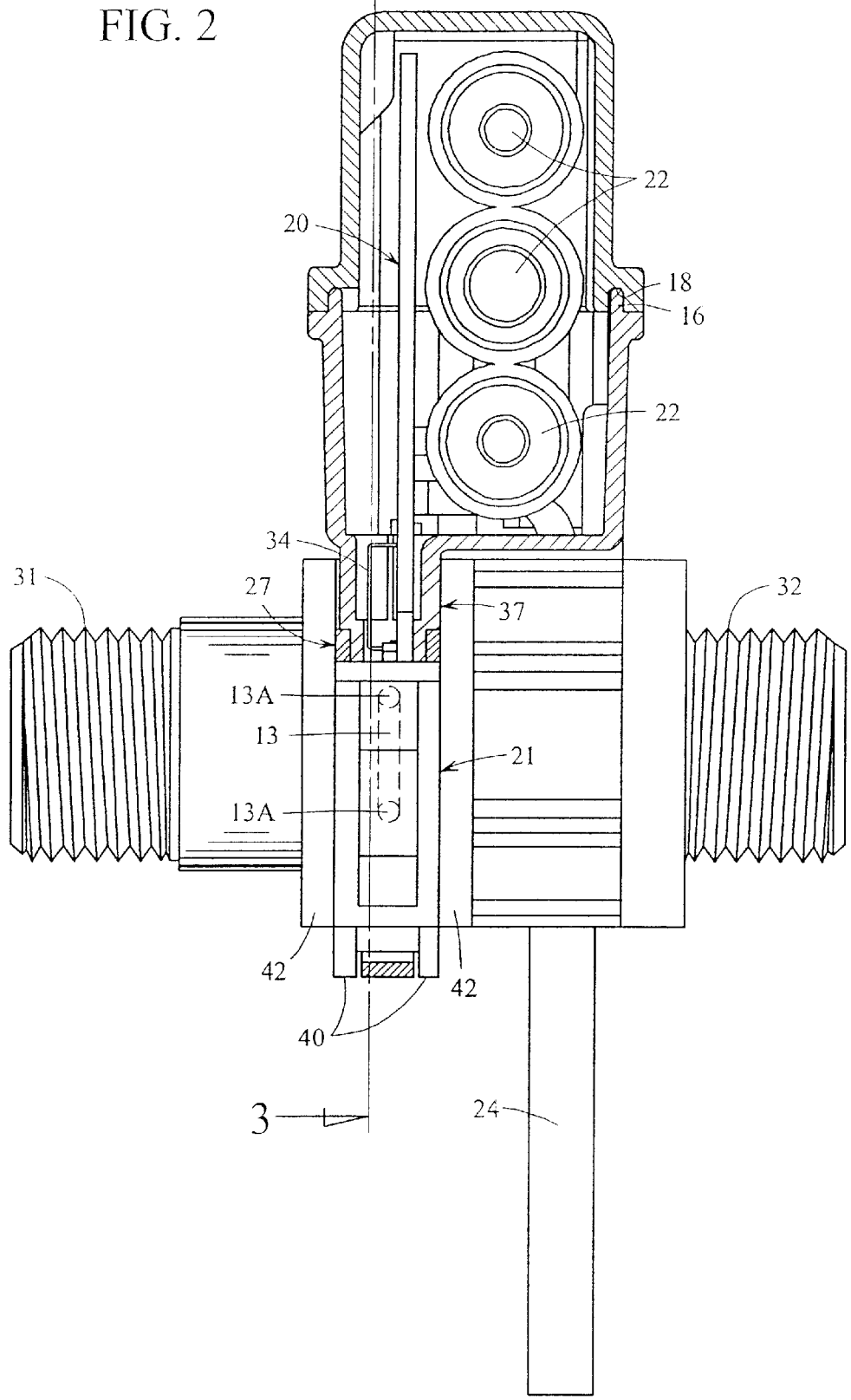
FIG. 2 is a sectional side view of the components of FIG. 1 assembled.

The flowmeter has a plastic case 10 which is made up of a body 12 and a cover 14. The body has an annular rib 16 (FIG. 2) which is received by an annular groove 18 in the cover and the two are permanently joined by sonic welding. The plastic case houses the electronics of the system which includes a circuit board 20 which can process a received repetitive signal and transmit related data to a remote device, batteries 22 for powering the electronics and an antenna (not shown) which is received by a flexible sheath 24 projecting from the casing.

Figure 1:
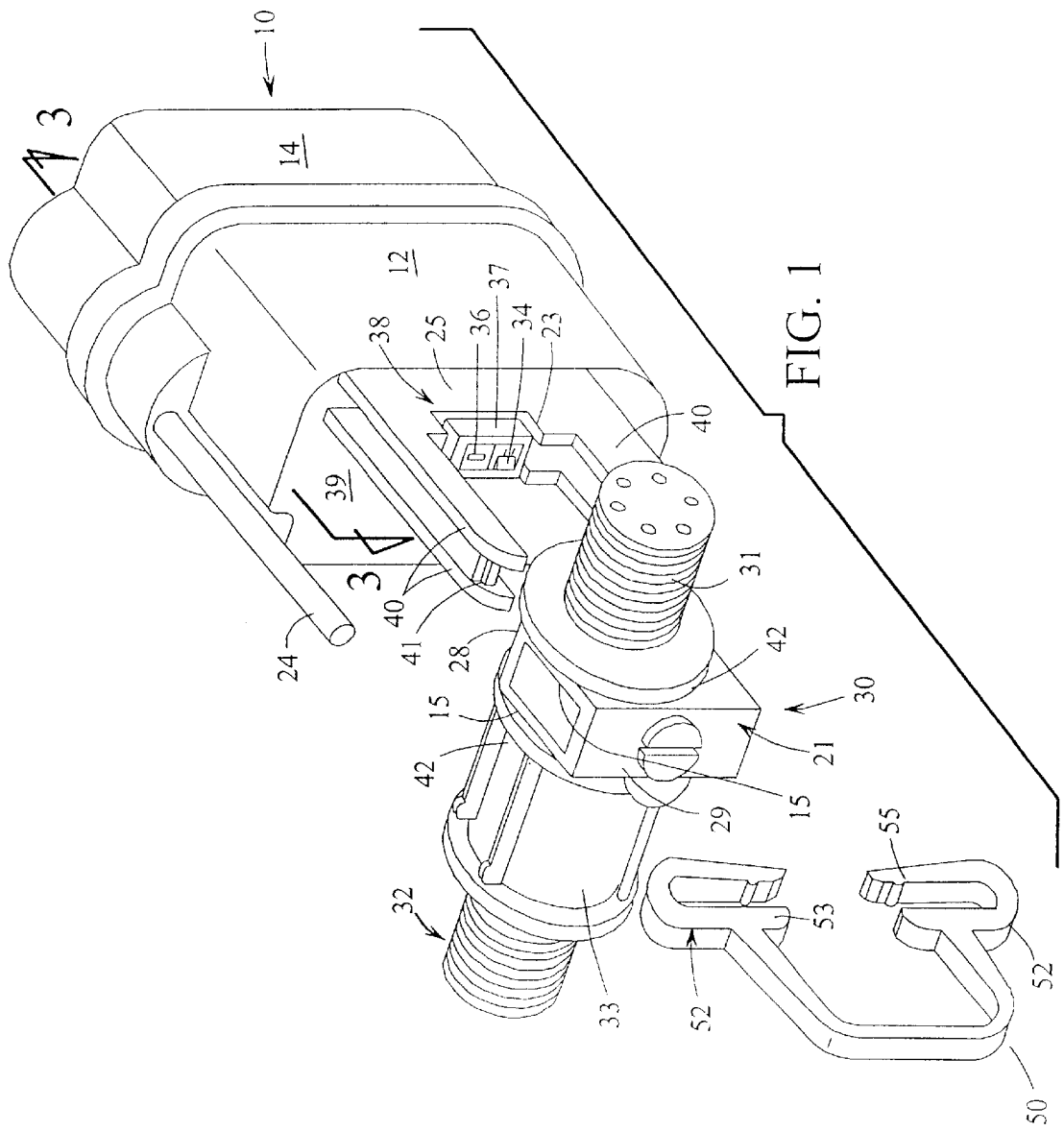
FIG. 1 is an oblique view of a flowmeter made in accordance with the teachings of the present invention with the individual components separated for clarity.

Connected to the electronics are a thermistor and a sensor 36 which detects a magnetic field, like a Hall cell (FIG. 3) or a Wiegan wire sensor. The thermistor and Hall cell are mounted within a box-like projection 37 which is part of a "U" shaped bracket 38 which projects outwardly from the front ("front" will be the left side of an object as shown in FIG. 1 and vertical/horizontal will be as shown in that FIG.) face 39 of the body 12 adjacent a pipe section 30 which houses a flow indicating device. These elements provide the electronics with suitable signals and the electronics transmit data to a remote receiver so that BTU consumption and/or water use can be computed.

Figure 3:
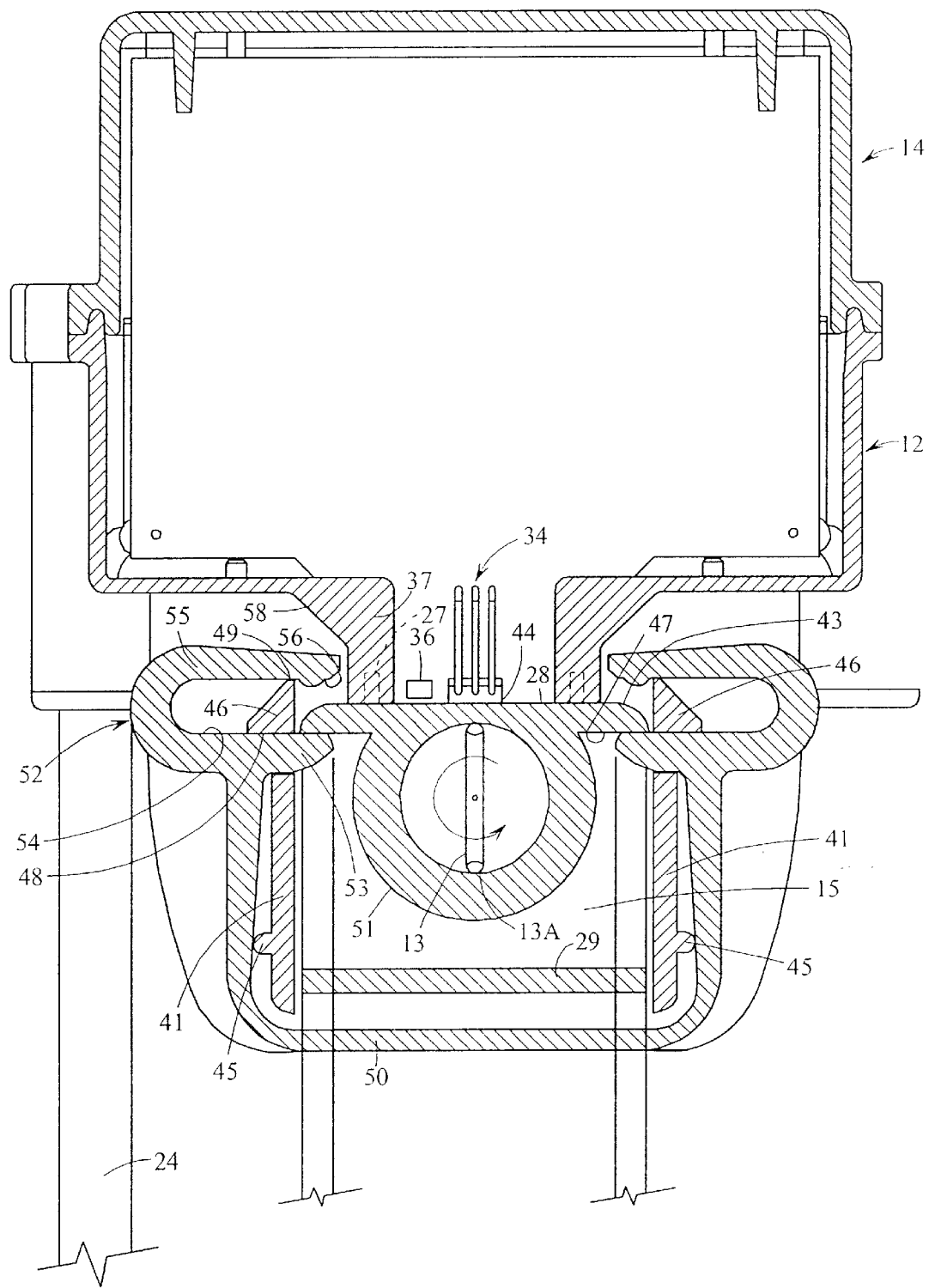
FIG. 3 is a sectional view of the assembled components taken at 3—3 of FIG. 2.
Figure 4:
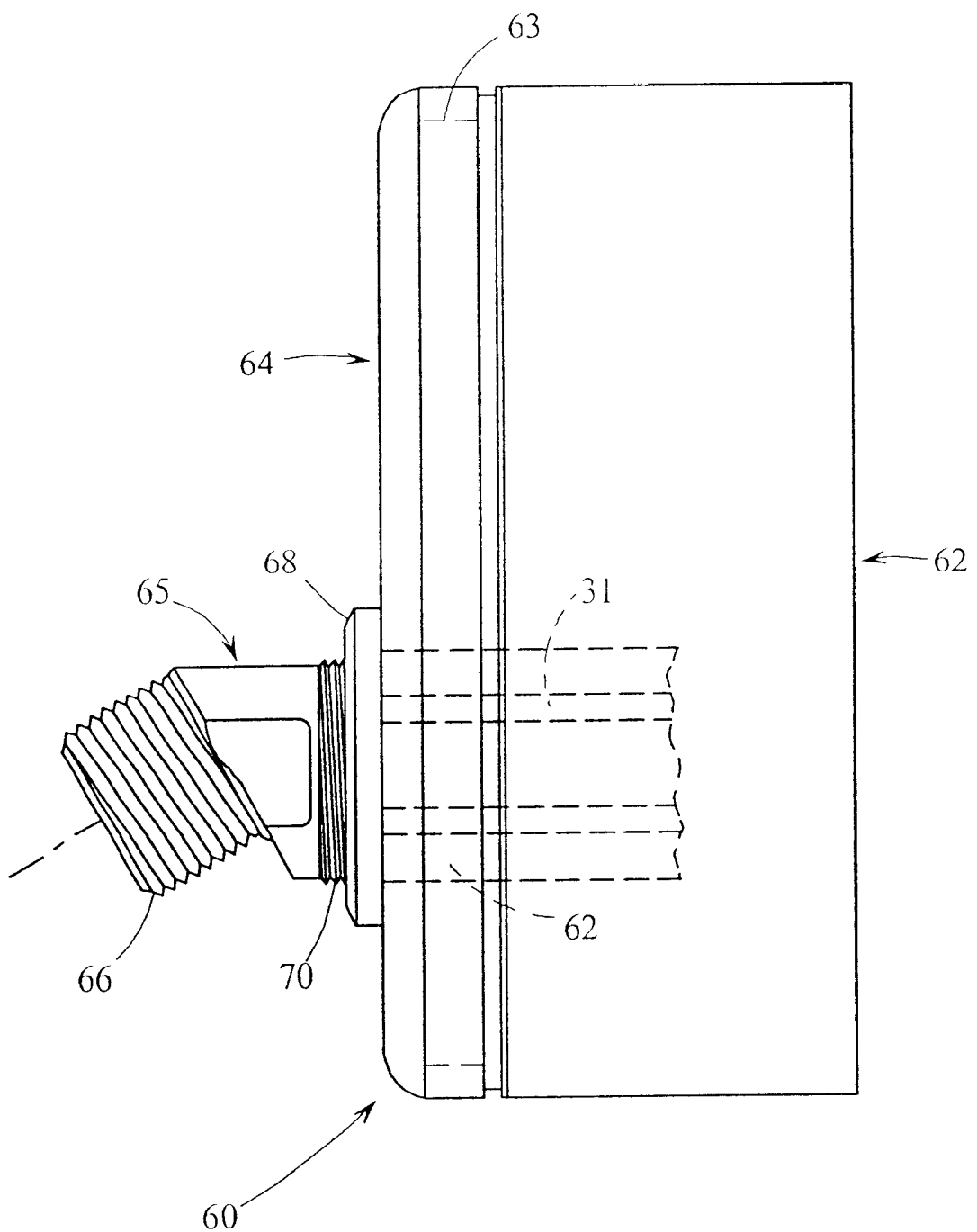
FIG. 4 is a side view of a meter housing.

The flow indicating device can be an axial turbine which has a number of vanes each of which has a ceramic target (a rotating vane 13 with two targets 13A is schematically shown in. FIG. 3.). Details of such a flow indicating device can be seen in U.S. Pat. No. 5,969,267 which are incorporated herein by reference). Briefly the axial turbine rotates as fluid flows through the pipe section 30 which has male 31,32 threaded ends. The body is designed to be engaged by a wrench or the like.

The "U" shaped bracket 38 which projects outwardly from the front face 39 of the body has upper and lower pairs of vertical brackets 40 which are integral with interconnecting vertical panels 25. Each of these vertical panels has a cut out 23 which will be filled by a seal 27 which is positioned around the box-like projection 37.

Between the male ends 31,32 of the pipe section are defined a pair of axially spaced annular rings 42 which are interconnected by a box-like frame 21. The box-like frame has vertical front 29, rear 28 and side 13 walls which define a box-like frame which is open at the bottom and at the top. A cylindrical housing 51 which houses the rotating vane portion 13 of the flow indicating device is located within this box-like frame and the rear edge merges with the rear wall 28 of the box-like frame to define a thin wall section 44 proximate the sensor and thermistor to facilitate heat and target sensing. As can be seen from FIG. 2, this box-like frame is set back from the rear edge of the annular rings 42 of the flow indicating device to define a volume into which the box-like projection 37 on the body can be located thereby preventing relative transverse displacement between the transmitting unit and the annular rings (the pipe section). The upper and lower pairs of brackets which lie proximate the top and bottom of the box-like frame 21 are also captured between portions of the annular rings which project upwardly and downwardly past the box-like frame.

A bracket pair 40 is strengthened by a web 41 which extends from a location slightly set back from the front of the bracket pair, rearwardly to a location a selected distance short of the rear wall 28 of the box-like frame. Each web 41 has a vertical transverse ridge 45 close to the front of the web. Also extending between each bracket pair 40 is a locking bar 46 defines an opening between the web 41 and the locking bar. The locking bar has a front face 48 which is to be in line with the front surface 47 of the rear wall 28 of the box-like frame when it is clamped against the box-like projection 37 of the body 12. The locking bar is substantially triangular in shape having a rounded catch portion 49 at the rear inner end of the locking bar.

A "U" shaped locking clip 50 clamps the box like frame 41 against the box-like projection 37 of the body. Each end of the clip has a "C" shaped operating clasp 52 which includes a front clamping arm 53 which projects through the opening between the web 41 and the locking bar 46 with the flat rear surface 54 of the clamping arm engaging both the locking bar 46 and the front face 47 of the rear wall 28. The "C" shaped operating clasp 52 additionally has a rear clamping arm 55 which extends parallel to the front clamping arm 53 and has a notched front surface 56 at its end to interconnect with the rounded catch portion 49. The locking clip 50 has a width corresponding to the spacing between the parallel struts 40.

As can be seen the Hall cell is centrally located so that if the plastic case is rotated 180° so that the top bracket is bottom, etc., the location of the Hall cell will not change relative to the thin section. The meter housing is accordingly axially captured between the parallel rings and is locked on the plastic casing by the locking clip. The top and bottom walls of the box like projection on the plastic case are beveled 58 to prevent access to the notched end 56 of the rear clamping arm 55.

The flowmeter can be located within a housing 60 which includes an escutcheon 62 in the form of a cylindrical cover having an annular front recess 63 for receiving a front bezel 64. An elbow 65 which has a threaded male end 66 for connection to a shower head (not shown) and a female threaded end 67 for connection to the male end 31 of the pipe section of the flowmeter. The housing is secured in place with a lock nut 68 which is threadedly received by an O.D. thread 70 on the male end of the elbow. Since the housing opening is eccentrically located, the flow meter can be rotated relative to the housing 360° to avoid interference with tile, tub or any wall discontinuity which would make it difficult to seal the assembly to the wall with caulking.

What is claimed is:

1. A system for monitoring the flow of water through a pipe comprising
    a pipe section adapted to be located in a water supply line for housing a flow indicating device including means for presenting readable information representative of flow through the pipe section,
    said pipe section including parallel vertical front and rear walls and opposed side walls interconnecting said front and rear walls, said rear wall having front and rear surfaces,
    a cylindrical central portion for housing said means for presenting readable information representative of flow through the pipe section,
    said cylindrical central portion extending through the opposed side Stalls and integral with the front surface of said rear vertical wall,
    a transmitting unit including a sensor for reading the readable information presented by said flow indicating device and transmitting data relating to flow to a remote receiver,
    a housing for said transmitting unit including a front vertical face, upper and lower brackets each defined by a pair of spaced vertical struts projecting horizontally outwardly from said front vertical face and having a selected width, and a pair of vertical panels extending outwardly from the front vertical face intermediate and integral with the vertical struts defining therewith a "U" shaped bracket,
    means for mounting said sensor between said pair of vertical panels,
    said opposed side walls having a spacing corresponding to the spacing between said pair of spaced vertical struts and being selectively sized to be located within said "U" shaped bracket with the rear surface of said rear wall proximate said sensor,
    said pipe section including projecting means at either side of said side walls for capturing said "U" shaped bracket thereby preventing side to side movement of said pipe section relative to said housing,
    a clip having an elongated band and a clasp at either end of said band,
    each clasp and said upper and lower brackets including means for nonreleasably securing said clip to said upper and lower brackets with said elongated band between the spaced vertical struts of said upper and lower brackets and along the front wall of said pipe section.

2. A system for monitoring the flow of water through a pipe according to claim 1, wherein said means for nonreleasably securing said clip to said upper and lower brackets with said elongated band between the spaced vertical struts of said upper and lower brackets and along the front wall of said pipe section comprising
    a horizontal opening in each of said upper and lower brackets adjacent to said rear wall of said pipe section,
    a locking bar dividing said opening in each of said upper and lower brackets into first and second openings,
    each locking bar having a first surface coplanar with an end of said r ear wall inner surface and a second catch surface,
    a clip having an elongated band and a "U" shaped clasp at either end of said band, each clasp having
    an inner clasp portion selectively sized for insertion through said first opening of one of said brackets,
    said inner clasp portion including surface means for simultaneously engaging said locking bar and the inner surface of said rear wall of said pipe section, and
    an outer catch portion for insertion through said second opening to lockingly engage a catch surface of one of said locking bars.

3. A system for monitoring the flow of water through a pipe according to claim 2, wherein said second opening is selectively sized to inhibit access to the free end of said catch portion when it is lockingly engaging a catch surface.

4. A system for monitoring the flow of water through a pipe according to claim 3, wherein said transmitting unit further comprises means for sensing the temperature of the water flowing through said pipe section and transmitting data related thereto to a remote receiver including a temperature sensor and wherein said means for mounting the first sensor between said pair of vertical panels includes means for supporting said temperature sensor.

5. A system for monitoring the flow of water through a pipe according to claim 3, wherein the thickness of said cylindrical central portion at the location where integral with the front surface of said rear vertical wall is reduced.

\* \* \* \* \*